US 6,735,248 B2

(12) United States Patent
Gu et al.

(10) Patent No.: US 6,735,248 B2
(45) Date of Patent: *May 11, 2004

(54) FAST CONVERGING EQUALIZER FOR A DEMODULATOR

(75) Inventors: Jian Gu, San Diego, CA (US); Jianping Pan, San Diego, CA (US)

(73) Assignee: International Business Machines Corporation, Armonk, NY (US)

(*) Notice: Subject to any disclaimer, the term of this patent is extended or adjusted under 35 U.S.C. 154(b) by 123 days.

This patent is subject to a terminal disclaimer.

(21) Appl. No.: 10/071,451

(22) Filed: Feb. 8, 2002

(65) Prior Publication Data

US 2002/0114385 A1 Aug. 22, 2002

Related U.S. Application Data

(63) Continuation of application No. 09/266,193, filed on Mar. 10, 1999, now abandoned.

(51) Int. Cl.[7] .................................................. H03H 7/30

(52) U.S. Cl. ....................................... 375/232; 375/350

(58) Field of Search ................................ 375/323, 232, 375/231, 233, 234, 343, 346, 350

(56) References Cited

U.S. PATENT DOCUMENTS

| | | | |
|---|---|---|---|
| 5,091,918 A | | 2/1992 | Wales |
| 5,285,480 A | | 2/1994 | Chennakeshu et al. |
| 5,425,059 A | * | 6/1995 | Tsujimoto .................... 375/347 |
| 5,581,581 A | | 12/1996 | Sato |
| 6,289,038 B1 | * | 9/2001 | Park ........................... 375/131 |
| 6,421,380 B1 | * | 7/2002 | Gu et al. ...................... 375/232 |

OTHER PUBLICATIONS

John G. Proakis, Digital Communications, Jan. 26, 1983, McGraw Hill, United States.

E. Eleftherious & D.Falconer, Adaptive Equalization Techniques for HF Cahnnels, 2/87, IEEE Journal on Selected Areas in Communications, vol. SAC–5, No. 2.

R. D'Avella, L. Moreno, M. Sant'Agostino, an Adaptive MLSE Receiver for TDMA Digital Mobile Radio, 1/89, IEEE Journal on Selected Areas in Communications, vol. 7, No. 1.

Modified Viterbi Equaliser for Mobile Radio Channels Having Large Multipath Delays, Sep. 14, 1989, Electronics Letters, vol. 25, No. 19.

(List continued on next page.)

*Primary Examiner*—Don N. Vo
(74) *Attorney, Agent, or Firm*—Blakely, Sokoloff, Taylor & Zafman LLP

(57) ABSTRACT

A method and a system for configuring and initializing an equalizer. The equalizer equalizes a signal received over a propagation channel. The received signal includes symbols, a synchronizing signal and is formed by one or more rays including a dominant ray. The method comprising the following: (a) generating a multi-path intensity profile of the propagation channel from the received signal; (b) determining an arrival time of the dominant ray and a propagation channel response corresponding to the arrival time based on the multi-path intensity profile; (c) decimating the received signal synchronously with the arrival time of the dominant ray to provide signal samples to the equalizer; (d) configuring the equalizer based on the multi-path intensity profile to deactivate some of the coefficients of the equalizer; and (e) initializing active coefficients of the equalizer based on the propagation channel response.

38 Claims, 7 Drawing Sheets-

OTHER PUBLICATIONS

J. Proakis, Adaptive Equalization for TDMA Digital Mobile Radio, 5/91, IEEE Journal on Selected Areas in Communications, vol. 40, No. 2.

G. D'Aria, R. Piermarini, V. Zingarelli, Fast Adative Equalizers for Narrow–Band TDMA Mobile Radio, 5/91, IEEE Journal on Selected Areas in Communications, vol. 40, No. 2.

E. Delre, G. Benelli, G. Castellini, R. Fantacci, L. Pierucci, L. Pogliani, Design of a Digital MLSE Receiver for Mobile Radio Communications, 12/91, IEEE Global Telecommunications Conference, Phoenix, Arizona.

G. Benelli, A. Fioravanti, A. Garzelli, P. Matteini, Some Digital Receivers for the GSM Pan–European Cellular Communication System, 6/94, IEEE Proc.–Commun., vol. 141, No. 3.

G. Benelli, A Garzelli, F. Salvi, Simplified Viterbi Processors for the GSM Pan–European Cellular Communication System, 11/94, IEEE Transactions on Vehicular Technology, vol. 43, No. 4.

European Telecommunications Standards Institute, Digital Cellular Telecommunications System (Phase 2+); Radio Transmission and Reception, 7/96, France.

* cited by examiner

T : TAILING BITS
GP: GUARDING PERIOD

FAST CONVERGING EQUALIZER FOR A DEMODULATOR

CROSS-REFERENCE TO RELATED APPLICATIONS

This is a continuation application of U.S. patent application Ser. No. 09/266,193 filed Mar. 10, 1999 now abandoned.

BACKGROUND OF THE INVENTION

1. Field of the Invention

The present invention relates generally to equalizers for digital receivers, and more particularly, to a transversal equalizer trained with a least mean squares (LMS) algorithm for use in a demodulator for digital radio receivers operating in severe noise/interference environment with multi-path propagation conditions.

2. Description of Related Art

Propagation conditions in mobile communications are often described as a multi-path fading channel model. In this model, the signal arriving at a receiver is a combination of rays, each of the rays is a replica of the original signal at the output of the transmitter but has a different strength and a different epoch. The relative delay between the first ray and the last ray can be several symbol (or information bit) intervals. For example, the delay can be up to 5 symbol intervals in Global Systems for Mobile communications (GSM).

In order to compensate for a largely dispersive multi-path fading channel, demodulators having a Viterbi equalizer (which utilizes Maximum Likelihood Sequence Estimation) are widely used (e.g., U.S. Pat. No. 5,091,918 granted to Wales, U.S. Pat. No. 5,285,480 granted to Chennakeshu et al. and U.S. Pat. No. 5,581,581 granted to Sato).

The Viterbi equalizer uses a propagation channel estimator to generate all possible signal sequences which could result from being transmitted through the estimated propagation channel. Due to the channel memory length, the number of such signal sequences is limited. These generated signal sequences are then compared with a received signal sequence. The generated signal sequence which is closest in code distance to the received signal is selected. The data sequence associated with the selected signal sequence is the recovered data sequence.

Propagation channel estimation is performed by detecting a known data sequence called midamble which is embedded in the middle of a signal burst. Good estimation of the propagation channel is crucial for the performance of the Viterbi equalizer. When the propagation channel becomes very noisy and/or there are strong interfering signals (both cases are common in the mobile communication environment), the performance of the Viterbi equalizer can be significantly compromised since good estimation of the propagation channel is not available. Furthermore, the Viterbi equalizer is complicated to implement.

It is known that a transversal equalizer is much easier to implement than the Viterbi equalizer, and that a transversal equalizer can handle a large offset if trained with the LMS algorithm. However, if the coefficients of the transversal equalizer are not properly initialized, the equalizer needs to be trained longer for convergence, i.e., its coefficients will take longer to converge to proper values. For this reason, the LMS algorithm is in general considered to be slow in converging.

Accordingly, there is a need for a system for configuring and initializing a transversal equalizer such that it can perform as well as or better than a Viterbi equalizer in severe noise and/or interference environment with multi-path propagation conditions.

SUMMARY OF THE INVENTION

The present invention is a method and a system for configuring and initializing an equalizer. The equalizer equalizes a signal received over a propagation channel. The received signal includes symbols, a synchronizing signal and is formed by one or more rays including a dominant ray. The method comprising the following: (a) generating a multi-path intensity profile of the propagation channel from the received signal; (b) determining an arrival time of the dominant ray and a propagation channel response corresponding to the arrival time based on the multi-path intensity profile; (c) decimating the received signal synchronously with the arrival time of the dominant ray to provide signal samples to the equalizer; (d) configuring the equalizer based on the multi-path intensity profile to deactivate some of the coefficients of the equalizer; and (e) initializing active coefficients of the equalizer based on the propagation channel response.

DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The present invention is a system for configuring and initializing a transversal equalizer. Using a LMS algorithm for training, a transversal equalizer can handle a large offset, even when the coefficients of the equalizer are not properly initialized. In such a case, the equalizer needs to be trained longer, thus its coefficients will take longer to converge to proper values. For this reason, the LMS algorithm is in general considered to be slow in converging. However, with proper configuration and initialization of the coefficients and timing reference, as provided by the system of the present invention, the transversal equalizer can converge fast enough to achieve a performance close to or better than that of a Viterbi equalizer in a noisy and/or strong interference environment such as the one near the specified sensitivity level and reference interference level described in the standard ETSI/GSM 05.05 for GSM systems. The transversal equalizer is also much less complicated than a Viterbi equalizer, thus, easier to implement.

Figure 1:
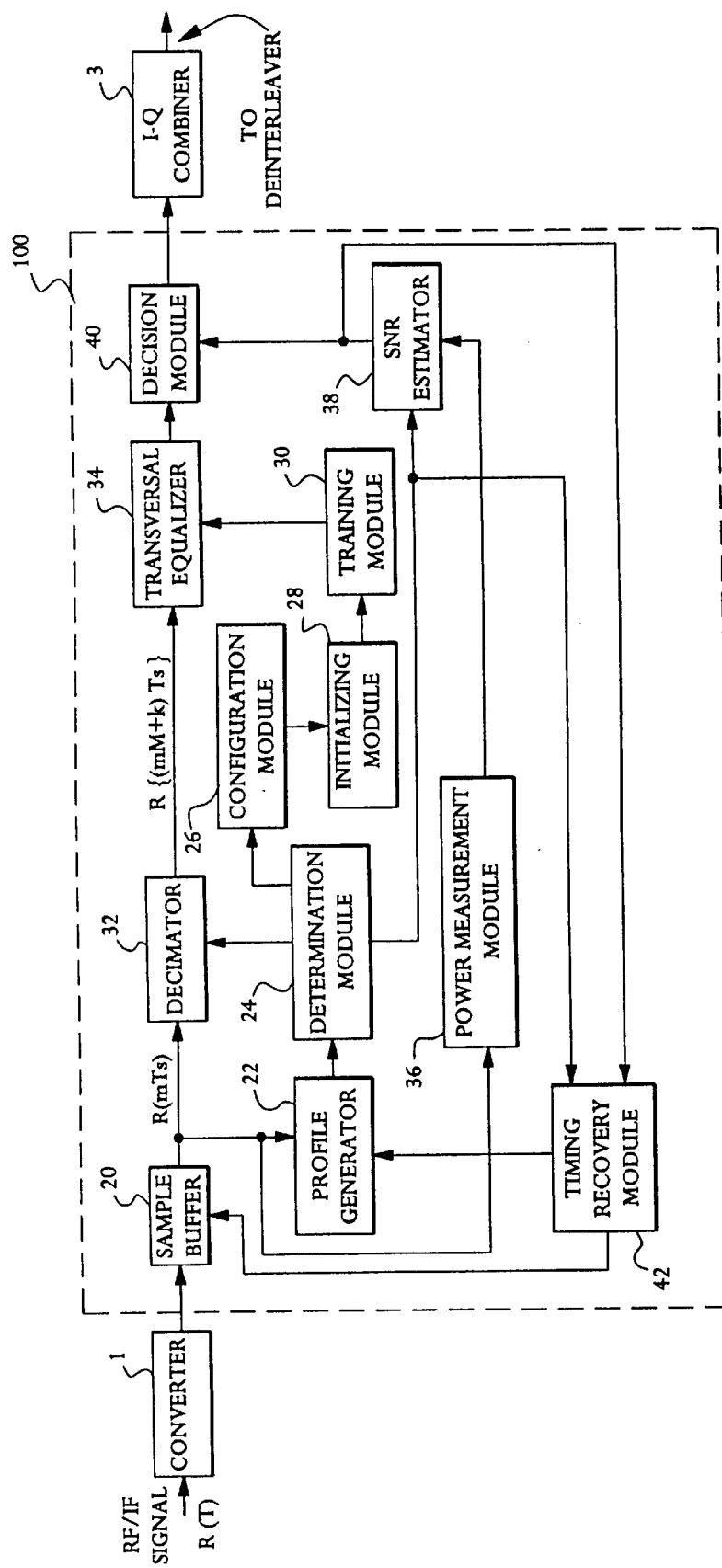
FIG. 1 is a block diagram of a demodulator of the present invention.

FIG. 1 shows a block diagram of the demodulator of the present invention. Referring to FIG. 1, the demodulator 100 is preceded by a converter 1 and followed by an optional I-Q combiner 3 (I-Q denotes in phase and quadrature).

The converter 1 includes all conversion modules needed to obtain, from a received radio frequency (RF) or intermediate frequency (IF) signal, a pair of baseband In-phase and Quadrature (I-Q) digital samples, denoted by $R(nT_s)=I(nT_s)+j\ Q(nT_s)$ in a complex number form, where $T_s=T_b/M$ is the sampling duration and $T_b$ is the bit interval. In GSM system, the bit interval $T_b$ is about 3.69 s.

The demodulator 100 demodulates the baseband I-Q signal and outputs a complex demodulated signal. The optional I-Q combiner 3 converts the complex demodulated signal to a one-dimensional sequence. The I-Q combiner 3 is used when the present invention is applied to a GSM system. It is noted that the optional I-Q combiner 3 may also be placed inside the demodulator 100, between the transversal equalizer 25 and the decision module 28.

GSM uses the Time Division Multiple Access (TDMA) method for multiple access, and Gaussian Minimum Shift Keying (GMSK) as modulation process. In GSM, a GMSK modulated signal is transmitted in burst format in an assigned time slot within a TDMA frame. Since the GMSK modulation is a binary modulation scheme, the symbol interval is equal to the bit interval $T_b$.

Figure 2:
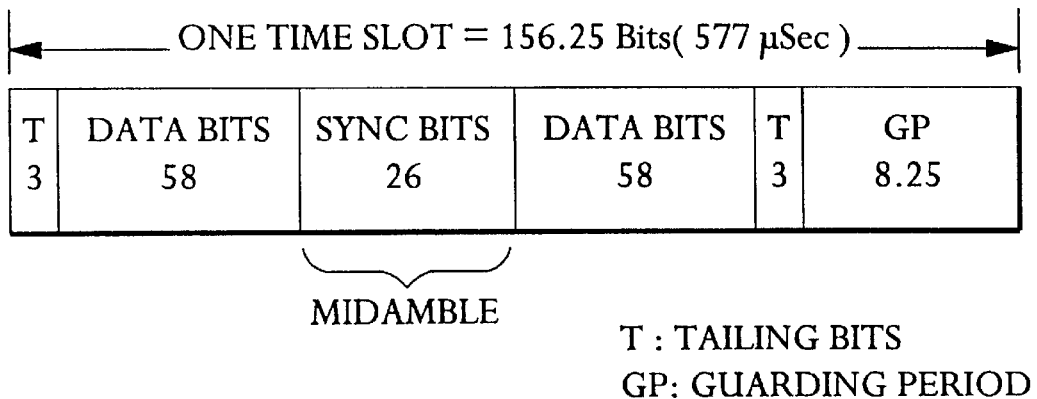
FIG. 2 illustrates the structure of the modulating bits in a time slot in GSM.

FIG. 2 shows the structure of bits in a burst to be transmitted in a time slot. There are 116 data bits which are separated into two parts by a synchronizing sequence of 26 bits. The data bits are preceded by 3 tailing bits and succeeded by 3 tailing bits and a guarding period of 8.25 bits. The synchronizing sequence is also called the midamble, due to its location in a burst. This burst is differentially encoded to produce a burst of modulating bits which is then inputted into the GMSK modulator. The output of the GMSK modulator is a carrier signal modulated by the burst of modulating bits. The demodulator 100 receives and demodulates the modulated carrier signal to recover the 116 data bits of the burst.

The baseband demodulator 100 comprises a sample buffer 20 to store a set of baseband samples of a received burst, a profile generator 22, a determination module 24, a configuring module 26, an initializing module 28, a training module 30, a decimator 32, a transversal equalizer 34, a power measurement module 36, a Signal-to-Noise-Ratio (SNR) estimator 38, a decision module 40, and a timing recovery module 42.

The sample buffer 20 stores the baseband I-Q samples collected at a rate $1/T_s$ which is a multiple of the bit rate $1/T_b$. The start time to collect samples of the received burst signal is controlled by the timing recovery module 42.

Figure 3:
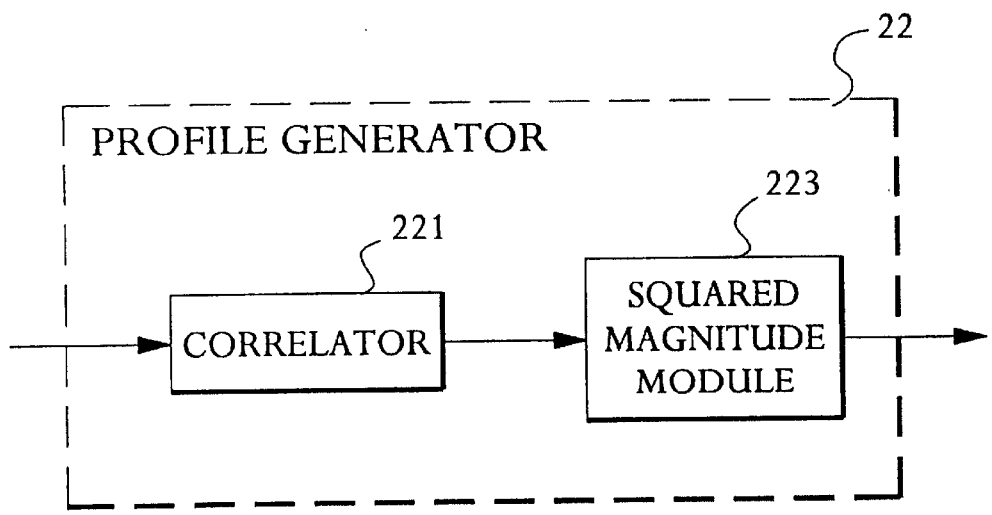
FIG. 3 is a diagram in more details of a profile generator shown in FIG. 1.

The profile generator 22 comprises a correlator 221 and a squared magnitude module 223, as shown in FIG. 3.

Figure 4:
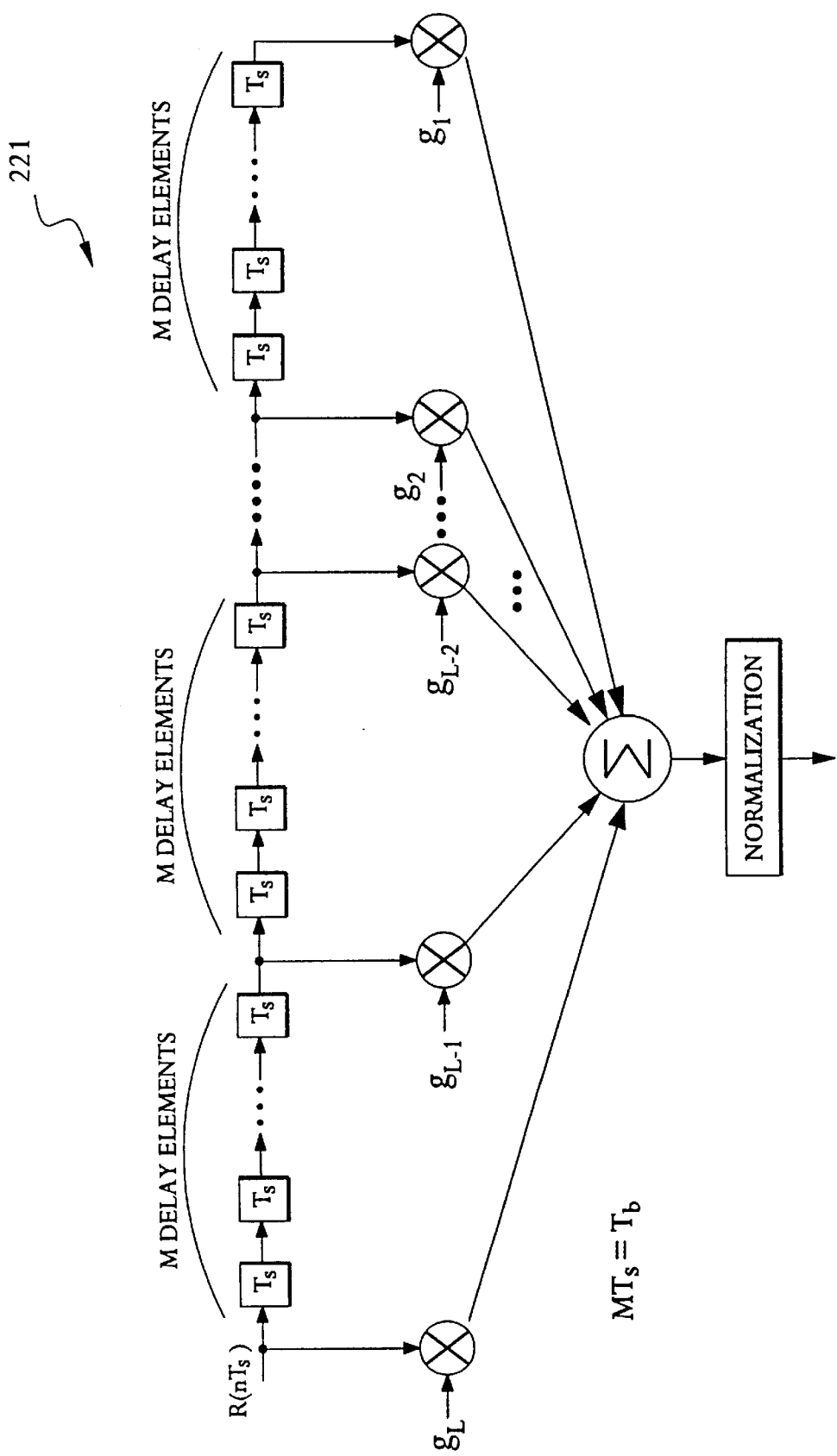
FIG. 4 is a diagram in more details of the correlator shown in FIG. 3.

FIG. 4 is a diagram of the correlator 221. The correlator 221 is a finite impulse response (FIR) filter implemented with a $T_s$-spaced tapped delay line having only L non-zero coefficients, where $1/T_s=M/T_b$. The L coefficients are the complex conjugates of the I-Q samples corresponding to the midamble portion of the received baseband signal at the sampling instants of interval $T_b$. At each cycle of $T_s$, the correlator 221 correlates L received I-Q samples. These L I-Q samples are spaced apart by $T_b$ in the sample buffer 12.

Under multi-path propagation conditions, the relative delay between the first ray and the last ray of the radio signal can be over a number of symbol durations. Typically, this number in GSM system is about 5. Assuming that $NT_b$ is the maximum relative delay between the first ray and the last ray, the midamble search window of the correlator 221 is of length $2NT_b$. This length allows the alignment of a nominal time with the center of the search window. Therefore, the time span of the related samples in correlation is $(2N+L)T_b$ and the total number of the output values is 2MN. The nominal time which is aligned with the center of search window is provided by the timing recovery module 42.

Figure 5:
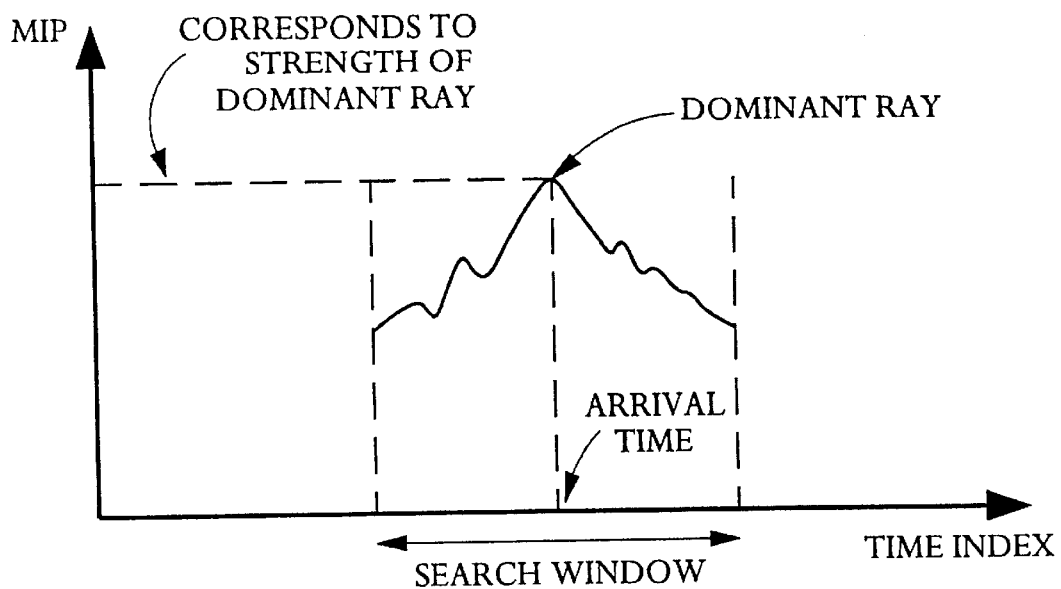
FIG. 5 illustrates an exemplary multi-path intensity profile (MIP) of the propagation channel as a function of the time indices of the outputs of the correlator.

The squared magnitude module 223 receives the complex correlator outputs from the correlator 221, and computes the squared magnitudes of the complex correlator outputs over the midamble search window. These squared magnitudes of the complex correlator outputs form a multi-path intensity profile (MIP) of the propagation channel as a function of the time indices of the complex correlator outputs. FIG. 5 illustrates an exemplary MIP of the propagation channel.

The auto-correlation function of the midamble signal is assumed to be ideal. If the received signal is formed by only one ray, then the MIP has only one peak and the time index of the peak corresponds to the arrival time of the single ray. If there are several rays with different arrival times, then there are several peaks, the values of which represent the strengths of the rays and the time indices of the peaks correspond to arrival times of the rays. The maximum magnitude value corresponds to the strength of the dominant ray of propagation path. If there is only one ray, the output of the midamble correlator which corresponds to the dominant ray is the propagation channel response. If there are several rays, then the output of the midamble correlator which corresponds to the dominant ray is an approximation of the propagation channel response. For example, if there is only one ray and the propagation channel response is C, and if the received signal is scaled by $C^*/|C|^2$, where $C^*$ is the conjugate of C, then the resulting signal can be perfectly demodulated without any equalization.

Figure 6:
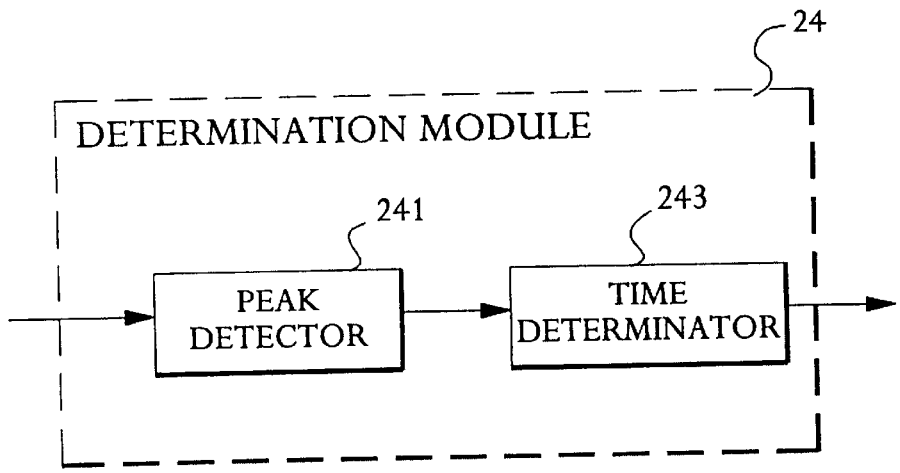
FIG. 6 is a diagram in more details of a determination module shown in FIG. 1.

Referring to FIG. 6, the determination module 24 comprises a peak detector 241 and a time determinator 243. The peak detector 241 determines a maximum value of the squared magnitudes of the complex correlator outputs. The time determinator 243 determines a time index which corresponds to the maximum value, and the propagation channel response. This time index is the arrival time of the dominant ray and the propagation channel response is the complex correlator output which corresponds to this time index.

The decimator 32 has a decimating rate of M:1. The epoch of the decimator 32 is aligned with the arrival time of the dominant ray as determined by the time determinator 243. Decimation on $R(nT_s)$ results in a sub-sequence $R((mM K)T)_s=R((mT_b KT_s)$ for m=0,1,2, . . . where K is related to the epoch of the decimator 32 and is an integer from the set $\{0, 1, \ldots, M-1\}$.

It is important to note that the nominal time, as determined by the time recovery module 42, and the epoch of the decimator 32, as determined by the time determinator 243, are not necessarily the same. For this reason, timing of each burst at the decimator 32 can be offset from the nominal timing at the sample buffer 20 by any fraction of symbol duration in a resolution as small as 1/M symbol duration, where M is the decimation factor of the decimator 32. For example, if the sample buffer operates to produce 8 samples per symbol, and if the decimator 32 outputs one sample per symbol, i.e., if M is 8, then the timing offset can be 0, 1/8, . . . , 6/8 or 7/8 symbol duration. This novel feature of the present invention allows accurate determination of the time location of the dominant ray. This in turn allows proper configuration and initialization of the transversal equalizer, which in turn facilitates fast convergence.

Figure 7:
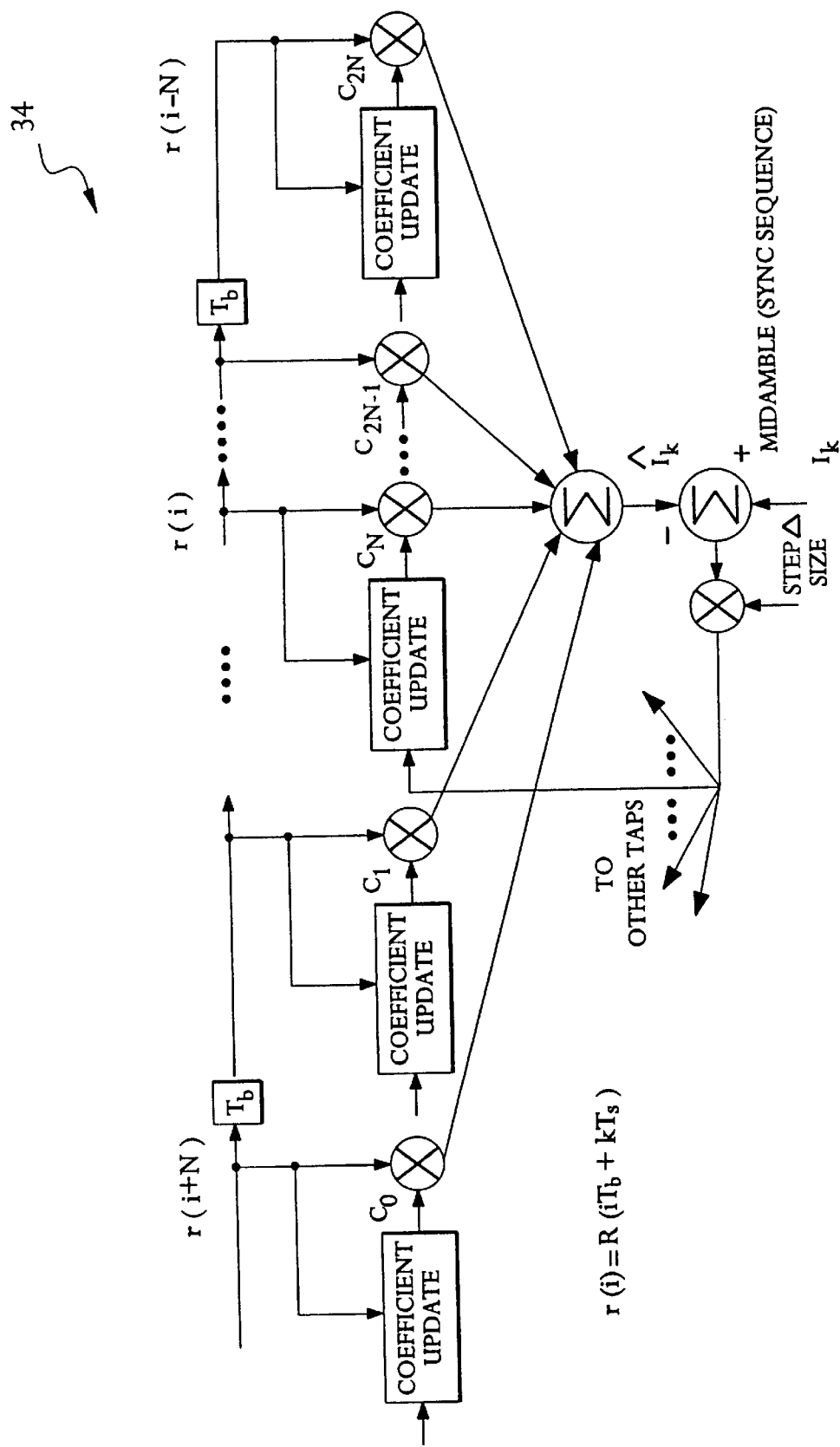
FIG. 7 illustrates a transversal equalizer shown in FIG. 1 at the start of the training mode.

FIG. 7 illustrates the transversal equalizer 34 at the start of the training mode. Referring to FIG. 7, the transversal equalizer 34 is a $T_b$-spaced tapped delay line equalizer in training mode with 2N+1 coefficients. The input signal of the equalizer 34 is $r(i)=R(iT_b+KT_s)$.

The equalizer 34 has initially 2N+1 coefficients, as determined by the configuring module 26. The configuring module 26 includes a module to determine an equalization characteristic of the MIP, and an optimizer to deactivate some of the coefficients when the equalization characteristic is less than a threshold. Thus, after being configured by the configuring module 26, the number of active coefficients of the equalizer 34 may be reduced from the initial number of 2N+1.

The configuring module 26 determines how many coefficients are needed to ensure good performance based on the estimated dispersion of the propagation channel, as provided by the MIP. After the configuration, some of the initial coefficients are excluded for the training process, i.e., these coefficiens will not be updated from their initial null values during the training process. The following discussion describes the coefficient reduction process used by the configuring module 26. The process can be performed by a software module.

Based on the MIP, the 2MN samples of the squared magnitudes are divided into 2N+1 subsets. An array mip[.] is defined by summing up M samples of squared magnitudes and assigning the sum to a corresponding element of the array. It is noted that mip[N] is the sum of M samples in the middle of the 2MN samples, and that mip[O] and mip[2N] have only M/2 samples in each summation. Each element of the mip[.] array corresponds to a coefficient of the transversal equalizer 34.

If the coefficient reduction process is performed by software, then the following C program can be used to implement it. In the following C program, start_tap is defined as the index of the first non-zero coefficient and end_tap as the last non-zero coefficient:

$$\text{if } \left( \sum_{i=0}^{2N} mip[i] < p * mip[N] \right)$$

where p is a scale factor to establish a threshold for the coefficient reduction process to operate when the propagation channel is not too dispersive, and are aggressiveness factors and are both less than 1. The larger the aggressive factors are, the more aggressive the coefficient reduction is. The non-causal coefficients, i.e., coefficients with indices from 0 to N, and causal coefficients, i.e., coefficients with indices from N+1 to 2N+1, can be treated differently by having, and different.

Figure 8:
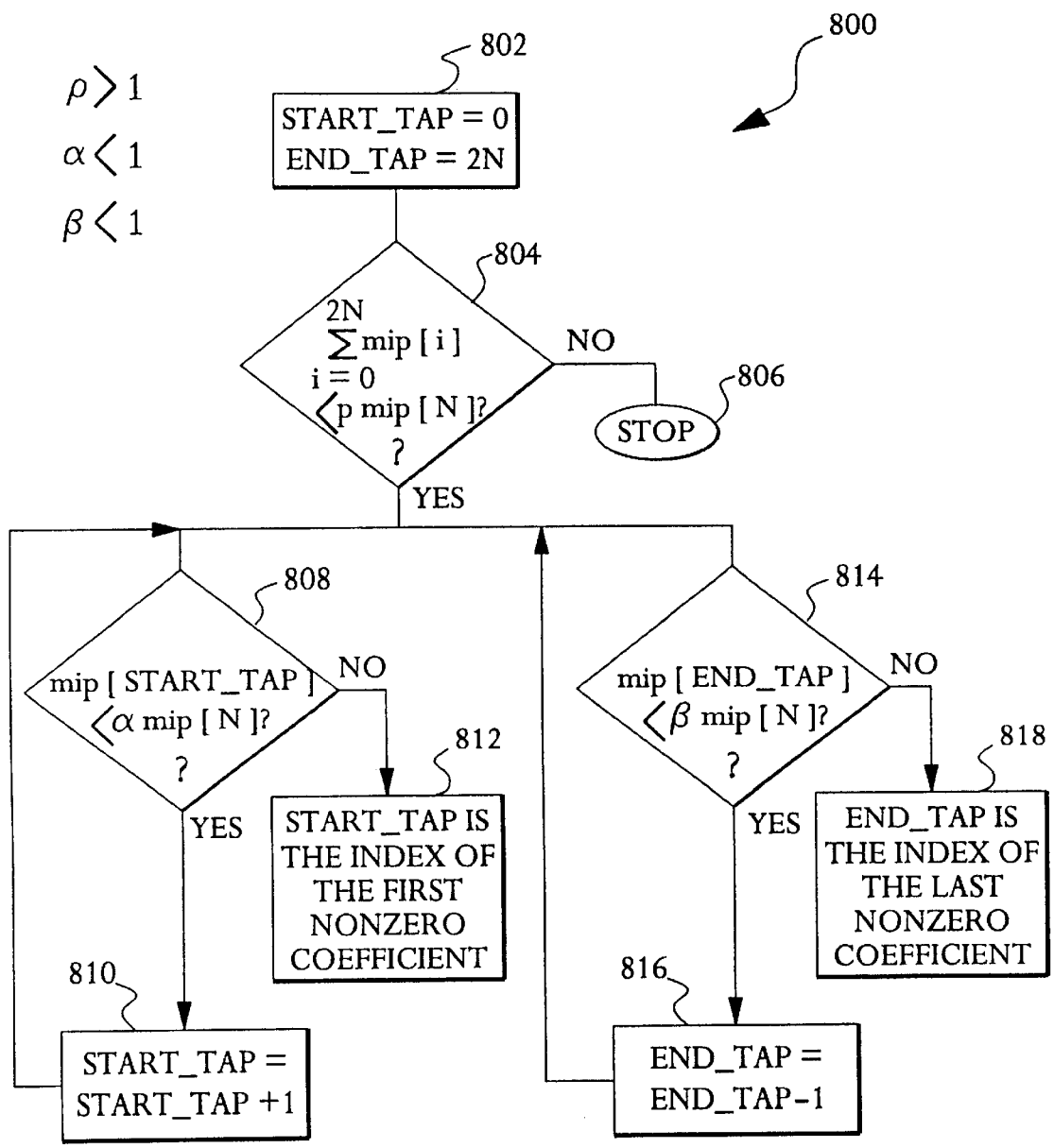
FIG. 8 is a flowchart of the coefficient-reduction process.

FIG. 8 is a flowchart of the coefficient reduction process 800.

Referring to FIG. 8, in block 802, the process 800 initializes the index start_tap of the first non-zero coefficient to be 0, and the index end_tap of the last non-zero coefficient to be 2N, 0 being the lowest order and 2N being the highest order. This means that the initial number of coefficients is 2N+1.

In block 804, the process 800 determines whether the equalization characteristic $$\sum_{i=0}^{2N} mip[i]/mip[N]$$

is less than p, a threshold for the coefficient reduction process to continue to operate. The threshold p is a number greater than 1.

If the equalization characteristic $$\sum_{i=0}^{2N} mip[i]/mip[N]$$

is equal or greater than p, this indicates that the propagation channel is too dispersive or that there is no dominant ray. This occurs when the MIP is substantially flat, and there is no clear peak indicating arrival of a dominant ray. In this case, the coefficient reduction process 800 terminates (block 806). Thus, the number of coefficients remains 2N+1, as initially.

If the equalization characteristic is less than p, this indicates that the propagation channel is not too dispersive. The coefficient reduction process 800 then operates from both ends of the set of coefficients.

In block 808, the process 800 determines whether mip[start_tap] is less than mip[N], being a number less than 1. If it is, then the process 800 deactivates the current coefficient with index start tap, sets the value of start tap to be the next higher index (block 810), and repeats operation in block 808 with the next mip array element, which corresponds to the next higher coefficient. By deactivating a current coefficient in block 810, the process 800 in effect reduces the number of active coefficients by 1.

If mip[start_tap] is not less than mip[N], then the process determines that the current value of start tap is the index of the first non-zero coefficient (block 812). In other words, the current coefficient is the first non-zero coefficient, starting from the lowest ordered coefficient. The process 800 then terminates the coefficient reduction from this lower order end of the set of coefficients.

In block 814, operating at the higher order end of the mip array, corresponding to the higher order end of the set of coefficients, the process 800 determines whether mip[end_tap] is less than mip[N], being a number less than 1. If it is, then the process 800 deactivates the current coefficient with index end_tap, sets the value of end_tap to be the next lower index (block 816), and repeats operation in block 814 with the next mip array element, which corresponds to the next lower coefficient. By deactivating a current coefficient in block 816, the process 800 in effect reduces the number of active coefficients by 1.

If mip[end_tap] is not less than mip[N], then the process 800 determines that the current value of $end_{tap}$ is the index of the last non-zero coefficient (block 818). The process 800 then terminates the coefficient reduction from this higher order end of the set of coefficients.

The process 800 can either operate concurrently from both ends of the set of coefficients, or sequentially from one end to the next. The aggressiveness factors and used by the process 800 are not necessarily equal. After the process 800 terminates, the number of active coefficients of the configured equalizer 34 may be much smaller than 2N+1. This reduced equalizer length will reduce the processing time needed by the equalizer 34 in demodulating a data burst.

The initializing module 28 initializes the remaining active coefficients of the equalizer 34 by equating all of the active coefficients to zero, except for the coefficient $C_N$ which is equated to the propagation channel response, as determined by the time determinator 243. It is noted that any coefficient can be selected to be equal to the propagation channel response. $C_N$ is selected for ease of implementation.

The training module 28 trains the initialized coefficients of the equalizer 34 using the well-known least-mean-squares (LMS). Referring to FIG. 7, the updated coefficients are computed according to the following formula:

$$C_{N+j}^{(k+1)} = C_{N+j}^{(k)} + D(I_k - \hat{I}_k) r * (i - j) \text{ for } j = -N, \ldots, -1, 0, 1 \ldots N$$

where $I_k$ and $\hat{I}_k$ are the k-th symbol of the midamble and the estimated received k-th symbol of the midamble, respectively, and is the step size of the updating process.

The index j may assume values of a smaller range as a result of coefficient reduction. $C_{N+j}^{(k)}$ is the coefficient after the (k-1)-th training and its final value is $C_{N+j}$. After training, all coefficient coefficients remain fixed during demodulation of the current received burst. Thus, after being trained by the training module 28, the equalizer 34 is simply a FIR filter.

The power measurement module 36 calculates the average signal power of the midamble portion, which is an average of $I^2+Q^2$ of the related I-Q samples outputted from the sample buffer 20. This average power includes noise power and/or interference power. Thus, it can be written as S+N, where S is the desired signal power and N is the power of undesired signals including noise and/or interference.

The SNR estimator 38 calculates S/(S+N−S), where S is the wanted signal power. S can be calculated from the output of the correlator 221 since the correlator 221 acts as a matched filter to the midamble and rejects most of the noise and interference.

The decision module 40 is a converter which scales the output of the equalizer 34 by the estimated SNR and transforms the scaled output to samples with a given bit-width.

Figure 9:
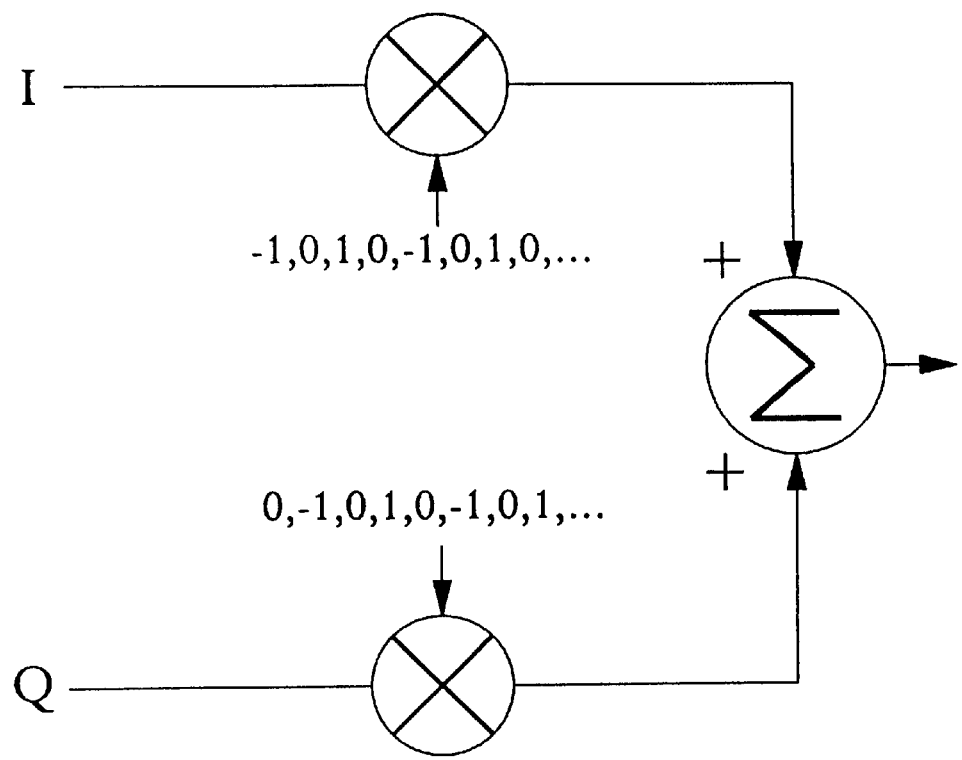
FIG. 9 is a diagram of the I-Q combiner for a GSM system.

The optional I-Q combiner 3 is illustrated in FIG. 9. The I-Q combiner 3 is applicable for the demodulation in GSM systems. It converts the complex representation of the signal to a one-dimensional sample sequence. The sign bit of each sample in the sequence is a data bit by hard decision. For the GSM application, the I-Q combiner 3 can also be placed between the transversal equalizer 34 and the decision module 40.

The timing recovery unit 42 collects the arrival times of the dominant rays of a number of bursts, as determined by the determination module 24 and calculates an average arrival time of dominant rays. This average arrival time is designated as the nominal time. Only the arrival times associated with "good" bursts are used in the averaging process, where "good" means that the estimated SNR of a burst, as determined by the SNR estimator 38, is large enough. The timing recovery unit 42 then compares the new nominal time with the previous nominal time and adjusts as necessary the clock/counter of the sample buffer 20 to ensure that the sample buffer 20 will store the desired samples. The nominal time thus controls the starting time of the storing of the desired samples arriving from the convertor 1.

The timing recovery unit 42 also provides the nominal time to the correlator 221 so that the search window for the midamble can be aligned properly, and to any other units that need the nominal time.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for configuring and initializing an equalizer, the equalizer equalizing a signal received over a propagation channel, the received signal having symbols, including a synchronizing signal and being formed by one or more rays including a dominant ray, the method comprising the operations of:
   (a) generating a multi-path intensity profile of the propagation channel from the received signal;
   (b) determining an arrival time of the dominant ray and a propagation channel response corresponding to the arrival time based on the multi-path intensity profile;
   (c) decimating the received signal synchronously with the arrival time of the dominant ray to provide signal samples to the equalizer, the equalizer having coefficients;
   (d) configuring the equalizer based on the multi-path intensity profile to deactivate some of the coefficients; and
   (e) initializing active coefficients of the equalizer based on the propagation channel response.

2. The method of claim 1 wherein the received signal is a digital signal corresponding to a baseband signal.

3. The method of claim 1 further comprising the operation of computing a nominal time, the nominal time being an average of selected arrival times of dominant rays in a plurality of past received signals.

4. The method of claim 3 further comprising the operation of storing the received signal in a sample buffer at a rate greater than one sample per symbol, a starting time of the storing of the received signal being regulated by the nominal time.

5. The method of claim 3 further comprising the operation of computing an average power of the synchronizing signal by computing an average of squared magnitudes of samples of the synchronizing signal.

6. The method of claim 5 further comprising the operation of computing a signal-to-noise ratio based on the average power of the synchronizing signal and a portion of the multi-path intensity profile, the signal-to-noise ratio being used for selecting the selected arrival times of dominant rays.

7. The method of claim 1 wherein, in operation (c), the signal samples are provided to the equalizer at a rate of one signal sample per symbol.

8. The method of claim 1 wherein operation (a) comprises the operations of:
   correlating the received signal with a sequence corresponding to the synchronizing signal to produce complex correlator outputs, each of the complex correlator outputs corresponding to a time index; and
   computing squared magnitudes of the complex correlator outputs, each of the squared magnitudes corresponding to a time index, the squared magnitudes forming the multi-path intensity profile.

9. The method of claim 8 wherein operation (b) comprises the operations of:
   determining a maximum value of the squared magnitudes of the complex correlator outputs; and
   determining a time index corresponding to the maximum value and the propagation channel response, the time index being the arrival time of the dominant ray, the propagation channel response being a complex correlator output corresponding to the time index.

10. The method of claim 1 wherein operation (d) comprises the operations of:
(1) determining a number of coefficients;
(2) determining an equalization characteristic of the multi-path intensity profile; and
(3) deactivating some of the coefficients when the equalization characteristic is less than a first threshold.

11. The method of claim 1 wherein operation (e) comprises the operations of:
equating the active coefficients with zero, except for a first active coefficient; and
equating the first active coefficient with the propagation channel response.

12. The method of claim 10 wherein the operation of deactivating some of the coefficients when the equalization characteristic is less than a predetermined threshold comprises the operations of:
(i) computing a set of test values from the multi-path intensity profile, the test values corresponding one-to-one to the coefficients, the coefficients being ordered;
(ii) deactivating a coefficient with a lowest order from the coefficients if a corresponding test value is smaller than a second threshold;
(iii) repeating operation (ii) for remaining coefficients until a test value corresponding to a coefficient with a lowest order is greater than or equal to the second threshold;
(iv) deactivating a coefficient with a highest order from the coefficients if a corresponding test value is smaller than a third threshold; and
(v) repeating operation (iv) for remaining coefficients until a test value corresponding to a coefficient with a highest order is greater than or equal to the third threshold.

13. The method of claim 12 wherein each of the test values is equal to a partial sum of squared magnitudes of the complex correlator outputs over a portion of the multi-path intensity profile, a middle test value corresponding to a middle portion of the multi-path intensity profile, the middle test value being one of the test values.

14. The method of claim 13 wherein the equalization characteristic is equal to a ratio of the sum of the test values to the middle test value.

15. The method of claim 13 wherein the first threshold is a number greater than 1.

16. The method of claim 13 wherein the second threshold is equal to a product of the middle test value and a number smaller than 1.

17. The method of claim 13 wherein the third threshold is equal to a product of the middle test value and a number smaller than 1.

18. The method of claim 1 further comprising the operation of updating the active coefficients of the equalizer.

19. The method of claim 18 wherein the operation of updating the active coefficients of the equalizer comprises the operation of training the coefficients using a least mean squares algorithm.

20. An system for configuring and initializing an equalizer, the equalizer equalizing a signal received over a propagation channel, the received signal having symbols, including a synchronizing signal and being formed by one or more rays including a dominant ray, the system comprising:
(a) a profile generator generating a multi-path intensity profile of the propagation channel from the received signal;
(b) a determination module coupled to the profile generator, the determination module determining an arrival time of the dominant ray and a propagation channel response corresponding to the arrival time based on the multi-path intensity profile;
(c) a decimator coupled to the determination module, the decimator decimating the received signal synchronously with the arrival time of the dominant ray to produce signal samples;
(d) the equalizer, having coefficients, coupled to the decimator to receive the signal samples, the equalizer equalizing the signal samples to produce a filtered signal;
(e) a configuring module coupled to the equalizer, the configuring module configuring the equalizer based on the multi-path intensity profile; and
(f) an initializing module coupled to the equalizer, the initializing module initializing the coefficients of the equalizer based on the propagation channel response.

21. The system of claim 20 wherein the received signal is a digital signal corresponding to a baseband signal.

22. The system of claim 20 further comprising a time recovery module, the time recovery module computing a nominal time, the nominal time being an average of selected arrival times of dominant rays included in a plurality of past received signals.

23. The system of claim 22 further comprising a sample buffer coupled to the time recovery module, the sample buffer storing the received signal at a rate greater than one sample per symbol, a starting time of the storing of the received signal being regulated by the nominal time.

24. The system of claim 22 further comprising a power measurement module, the power measurement module computing an average power of the synchronizing signal by computing an average of squared magnitudes of samples of the synchronizing signal.

25. The system of claim 24 further comprising a signal-to-noise ratio estimator, the signal-to-noise ratio estimator computing a signal-to-noise ratio based on the average power of the synchronizing signal and a portion of the multi-path intensity profile, the signal-to-noise ratio being used for selecting the selected arrival times of dominant rays.

26. The system of claim 20 wherein the decimator produces the signal samples at a rate of one signal sample per symbol.

27. The system of claim 20 wherein the profile generator comprises:
a correlator correlating the received signal with a sequence corresponding to the synchronizing signal and generating complex correlator outputs, each of the complex correlator outputs corresponding to a time index; and
a squared magnitude module coupled to the correlator, the squared magnitude module computing squared magnitudes of the complex correlator outputs, each of the squared magnitudes corresponding to a time index, the squared magnitudes forming the multi-path intensity profile.

28. The system of claim 27 wherein the determination module comprises:
a peak detector determining a maximum value of the squared magnitudes of the complex correlator outputs; and
a time determinator determining a time index corresponding to the maximum value and the propagation channel response, the time index being the arrival time of the dominant ray, the propagation channel response being a complex correlator output corresponding to the time index.

29. The system of claim 27 wherein the configuring module determines a number of coefficients and comprises:

(1) a first module determining an equalization characteristic of the multi-path intensity profile; and (2) an optimizer deactivating some of the coefficients when the equalization characteristic is less than a first threshold.

30. The system of claim 27 wherein the initializing module equates the active coefficients with zero, except for a first active coefficient, and equates the first active coefficient with the propagation channel response.

31. The system of claim 29 wherein the optimizer performs the following:

(i) computing a set of test values from the multi-path intensity profile, the test values corresponding one-to-one to the coefficients, the coefficient being ordered;

(ii) deactivating a coefficient with a lowest order from the coefficients if a corresponding test value is smaller than a second threshold;

(iii) repeating operation (ii) for remaining coefficients until a test value corresponding to a coefficient with a lowest order is greater than or equal to the second threshold;

(iv) deactivating a coefficient with a highest order from the coefficients if a corresponding test value is smaller than a third threshold; and (v) repeating operation (iv) for remaining coefficients until a test value corresponding to a coefficient with a highest order is greater than or equal to the third threshold.

32. The system of claim 31 wherein each of the test values is equal to a partial sum of squared magnitudes of the complex correlator outputs over a portion of the multi-path intensity profile, a middle test value corresponding to a middle portion of the multi-path intensity profile, the middle test value being one of the test values.

33. The system of claim 32 wherein the equalization characteristic is equal to a ratio of the sum of the test values to the middle test value.

34. The system of claim 32 wherein the first threshold is a number greater than 1.

35. The system of claim 32 wherein the second threshold is equal to a product of the middle test value and a number smaller than 1.

36. The system of claim 32 wherein the third threshold is equal to a product of the middle test value and a number smaller than 1.

37. The system of claim 20 further comprising a training module coupled to the equalizer, the training module updating the coefficients of the equalizer.

38. The system of claim 37 wherein the training module trains the active coefficients using a least mean squares algorithm.

* * * * *